United States Patent [19]

Kurnit

[11] Patent Number: 5,174,442
[45] Date of Patent: Dec. 29, 1992

[54] CASSETTE SLEEVE WITH TEAR CARDS

[76] Inventor: Philip S. Kurnit, 15 Engle St., Englewood, N.J. 07631

[21] Appl. No.: 852,689

[22] Filed: Mar. 17, 1992

[51] Int. Cl.[5] .................... B65D 69/00; B65D 85/672
[52] U.S. Cl. ................................. 206/232; 206/387; 206/491
[58] Field of Search ............... 206/387, 232, 491, 492, 206/831

[56] References Cited

U.S. PATENT DOCUMENTS

| | | | |
|---|---|---|---|
| 2,799,391 | 7/1957 | Eisner | 206/232 |
| 3,583,729 | 6/1971 | DeGroot | 206/232 X |
| 5,078,268 | 1/1992 | Olson et al. | 206/387 |

FOREIGN PATENT DOCUMENTS

| | | | |
|---|---|---|---|
| 430013 | 6/1991 | European Pat. Off. | 206/831 |
| 2516720 | 10/1976 | Fed. Rep. of Germany | 206/232 |
| 2558579 | 7/1977 | Fed. Rep. of Germany | 206/387 |
| 198022 | 12/1938 | Switzerland | 206/232 |

*Primary Examiner*—William I. Price
*Attorney, Agent, or Firm*—Henry R. Lerner

[57] ABSTRACT

A packaging device for an audio cassette comprising a sleeve having opposed front and rear walls, opposed side walls and end openings for permitting the introduction of a cassette within a sleeve. A flap extends from the sleeve and is easily detachable from the sleeve to define a card, which has printed material thereon related to the audio material recorded on said tape.

14 Claims, 3 Drawing Sheets

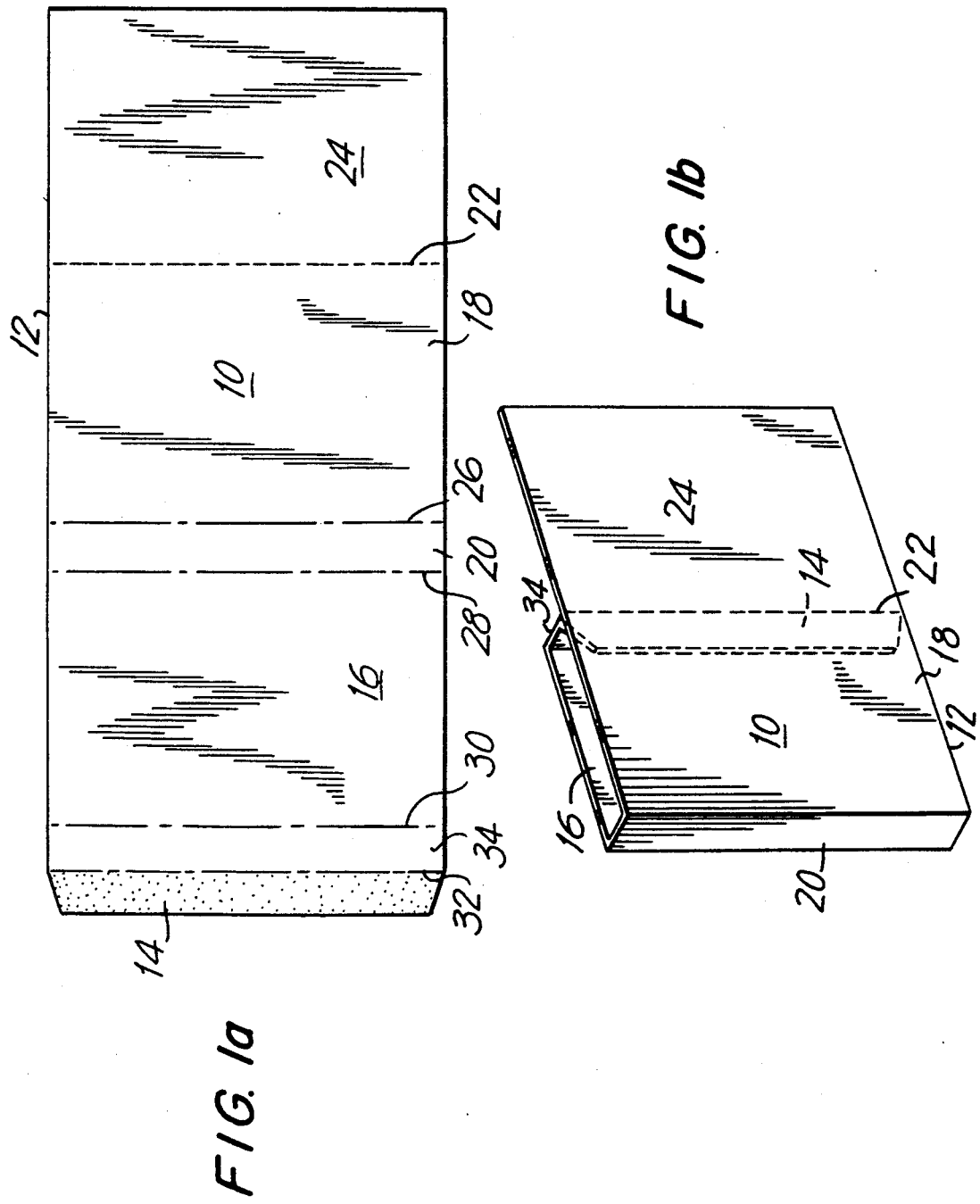

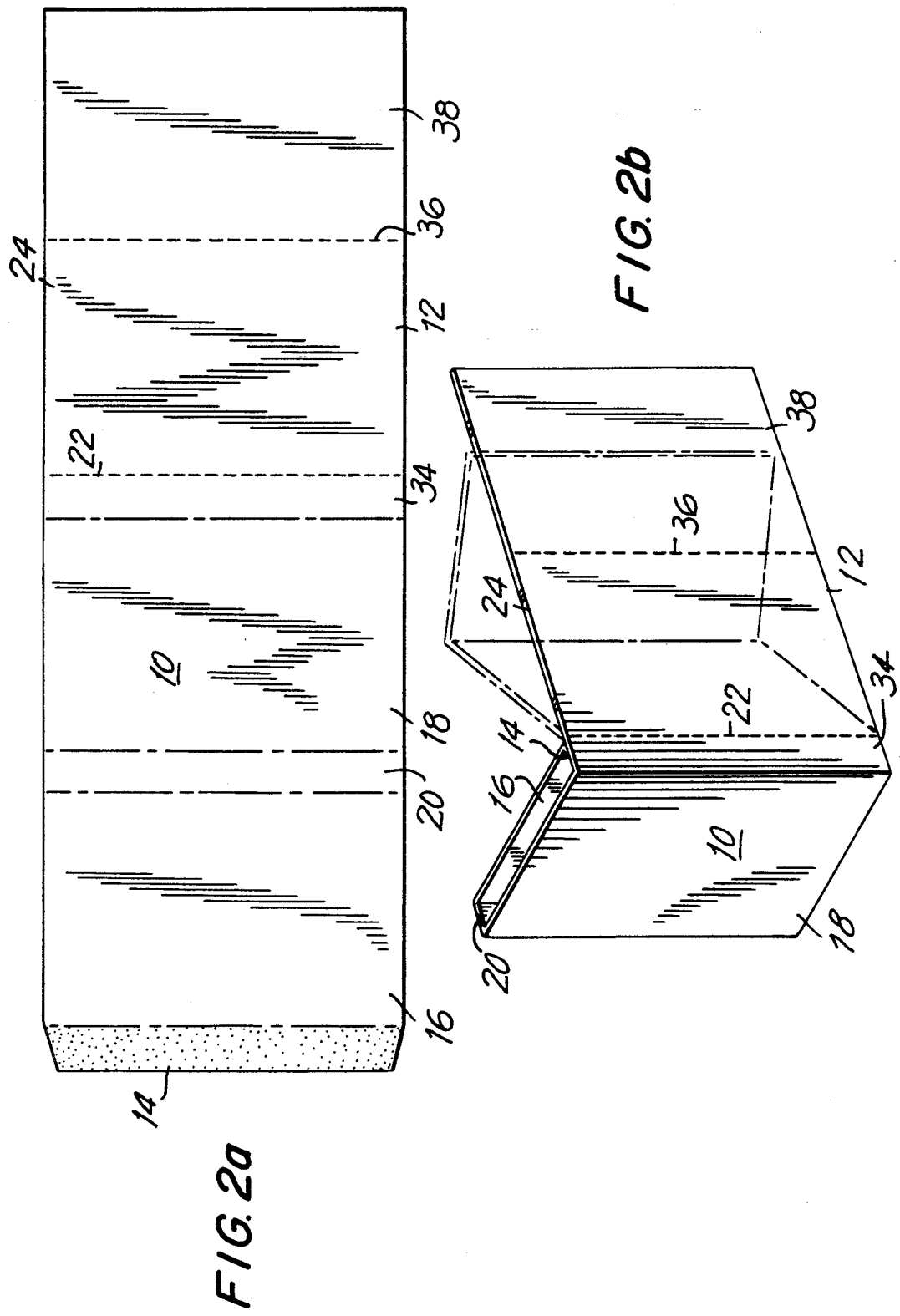

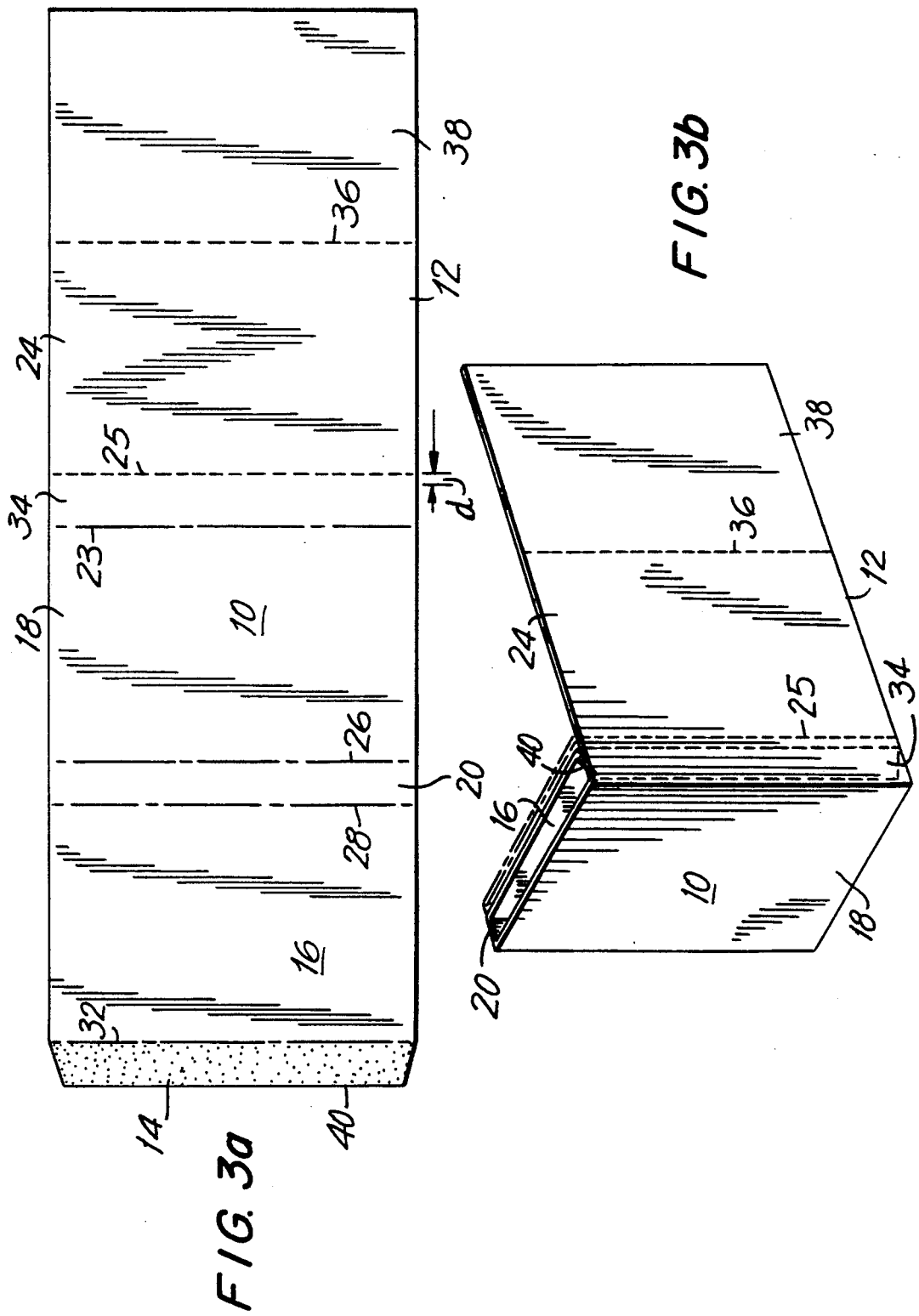

CASSETTE SLEEVE WITH TEAR CARDS

BACKGROUND OF THE INVENTION

The present invention relates to a packaging device for an audio or video cassette tape which, includes a wrap-around sleeve about the audio cassette tape and, further, one or more tear cards extending from the sleeve, which tear cards can be selectively removed, as desired. In accordance with the preferred embodiment, the entire packaging device including the wrap-around sleeve and the tear cards are constructed from a single sheet of cardboard or card stock and scored or perforated in accordance with the teaching of the present invention. It is a specific aspect of the present invention that the cassette tape adapted and intended to be inserted in the sleeve have recorded thereon a description of an event of interest and that the printed information contained on the tear cards relate to the audio/video material recorded on the cassette tape contained within the sleeve. The consumer, upon purchasing the cassette can selectively remove the tear cards, remove the cassette from its sleeve and listen and/or view the material recorded on the tape sleeve while reviewing the printed information on the one or more tear cards. For example, the cassette could relate to the 1951 play-off game between the New York Giants and the Brooklyn Dodgers for the National League pennant. The recorded material on the audio cassette tape could consist of the announcer's description of the last inning of the game and the tear off panels could carry photographs of the key participants in the game as, for example, Bobby Thomson and Ralph Branca. The consumer who purchases the cassette, removes the shrink wrapping therefrom, then withdraws the cassette from the sleeve and places it into a tape reproducing device. Then, the tear cards can be severed from the sleeve and, if properly sized, could define conventional baseball cards. Thus, there is provided in accordance with the invention, a sleeve adapted to contain a cassette, which sleeve includes tear cards severable from the sleeve, without violating the integrity of the sleeve, which tear cards depict subject matter related to the material recorded on the cassette intended to be housed in the sleeve.

DESCRIPTION OF THE PRIOR ART

Packages for audio cassette tapes are, today, commercially available. Attention is directed to U.S. Pat. No. 4,433,780 which shows a greeting card comprising a foldable member formed of a certain thickness of stock paper and carrying thereon a receptacle having a configuration that is complementary to the configuration of standard audio cassette tape. The package is intended to snugly receive the audio cassette tape therein. The outwardly extending members of the stock material are, after the audio cassette tape is inserted, folded in a specific manner and, then, by use of a pressure sensitive seal, the device is secured. While there are perforations and score lines provided to the greeting card of the '780 patent, there is no disclosure or teaching therein of having one or more of the panels severable from the greeting card, nor is there any disclosure or description of panels having the specific printed material which directly relates to the material recorded on the audio cassette tape.

U.S. Pat. No. 4,828,105 also discloses a cassette holding card in which an audio cassette tape is sandwiched between panels. Here, again, however there is neither a teaching nor a suggestion of having tear cards severable from the protective sleeve for the audio cassette tape, which tear cards specifically relate to the audio material recorded on the cassette tape. In addition, the package shown in the '105 patent is significantly larger and bulkier than that provided by the present invention which severely limits its application to the intended purpose of the subject invention. The present invention, on the other hand, provides an extremely compact protective sleeve for an audio cassette tape and further includes tear-off panels, which substantially correspond in dimensions on size to that of the face of the protective sleeve and do not further enlarge the overall shipping package.

U.S. Pat. No. 4,765,466 relates to a folio of card material adapted for receiving an article, preferably an audio cassette tape. The sheet is folded to form panels which are significantly larger than the flat panel of the cassette tape itself and, yet, a pocket is formed in the interior of the book-like shape to receive an audio cassette tape therein. Here, again, there is neither a teaching or suggestion of providing tear-off cards from the card stock, which cards are related in printed content to the audio recorded content of the cassette tape. Here, too, the '466 patent shows the use of significantly more card stock material than that which is required for merely protecting the audio cassette tape during shipment.

U.S. Pat. No. 4,445,612 shows a self locking box for cassette tapes and includes an information flap attached thereto. As best seen in FIG. 1 of the '612 patent, the entire shipping container and information flap is made from a single sheet of cardboard stock, with the panels being formed by scoring. The information flap is not, however, intended to be removed from the card stock but, rather, is specifically intended to be maintained along with the shipping container for the audio cassette tape. In contrast, however, the present invention contemplates that the information flap i.e., a panel of printed material, be perforated so that it can be selectively removed. This is particularly important if the information flap is, indeed, a baseball card which has value to adults and children for trading an bartering purposes.

U.S. Pat. No. 3,829,132 relates to a cover for an audio cassette tape which further includes a booklet of information relating to the audio cassette tape. The cover is made from stock material and is, again, of greater dimension than the audio cassette tape itself, so as to also accommodate the booklet of information.

U.S. Pat. No. 3,311,281 relates to a tubular carton formed from a single sheet of cardboard-like stock and including a coupon and display tab. The coupon and display tab are provided with a line of perforation so that they can be selectively removed from the tubular carton. This patent provides a device which is far more complicated to manufacture and, indeed, the display tab and coupon are of a dimension significantly less than the largest flat panel of the tubular carton, whereas, in the present invention, in contrast the tear-off panels are desirably of the same dimension as the largest panel of the sleeve, which is itself adapted to receive the audio cassette tape. In addition, there is neither a teaching nor a suggestion in the '281 patent of providing two or more tear off cards or panels each of which has printed information related to the recorded audio material contained on an audio cassette tape.

U.S. Pat. No. 4,108,350 relates to a shipping carton having an integral yet removable card portion. This shipping carton is not described with reference to an audio cassette tape. Here, again, however, the removable card portion is a coupon which is not of the same dimensional size as the largest flat panel of the sleeve, and therefore, would be unsuitable for the present purpose, namely providing a printed information card which is selectively removable from a sleeve for an audio cassette tape, the tear-off cards being substantially the same size as the largest flat panel of the shipping sleeve.

The one piece carton in the 350' patent, when folded in accordance with pre-determined fold lines, defines a package for containing pre-selected goods. Extending from the contour of the package is a strip which is attached to the main package by a line of perforation, such that the strip can be severed from the package. The strip is intended to be a coupon having some relationship to the contents of the package. The size of the tear card is substantially smaller than the larger face of the package so that it would not be useful for merchandising baseball cards, as intended for at least one application of the present invention.

U.S. Pat. No. 2,790,587 shows a box having a tear-off portion. The device shown by the '587 patent is a sleeve which is adapted to receive a tray which serves to contain small size merchandise such as food, confections, medicines, etc. A strip 3 extends from the tray and not from the sleeve as in the subject invention.

The present invention includes a provision for accommodating the thickness of all of the tear-off cards when they are folded one on top of the other. Thus, one side panel of the sleeve has a greater width than its opposite side panel. The side panel, including the tear-off cards extending therefrom, extends beyond the width of its opposite side panel such that the tear-off cards can be folded and placed flatly against the panels of the sleeve.

SUMMARY OF THE INVENTION

The present invention relates to a protective sleeve for an audio cassette tape, preferably made from a single sheet of card stock material. The sleeve is scored so that it can be folded into front and back face panels interconnected by side panels. A glue flap is provided to secure the sleeve. When the sleeve portion of the device is folded along the score lines, the glue flap is folded beneath a portion of the back panel to thereby form a sleeve capable of selective receipt of an audio cassette tape. The sleeve provides a snug fit for the cassette tape and protects the same during shipping and during display and merchandising. Extending from the back panel is a flap-like extension, which is separated from the back panel by a perforation. After the consumer purchases the audio cassette tape, housed within the sleeve, the cassette tape can be removed from the interior of the sleeve and the flap-like extension can easily be severed from the sleeve by bending and tearing along the line of perforation. In the preferred embodiment, two or more flaps or cards are secured to the back panel, the cards being separated by the perforation lines. The audio cassette tape intended to be inserted in the sleeve ha recorded thereon the description of a sporting event and the flaps or tear-off panels have printed indicia related to the sporting event. For example, the audio cassette tape might relate to a championship game, such as, a World Series game, and the tear-off flaps are essentially similar to the conventional baseball cards, which can be traded, sold or otherwise disposed of as in the case of baseball cards. Adults and children can reveal the information contained on the flaps and swap them or trade them as desired.

In an alternate embodiment of the present invention, the width of one of the side panels to which the tear-off flaps is secured, is greater than the width of the opposite side panel, so that a plurality of tear-off panels can be folded and secured to the sleeve without increasing the overall thickness of the package.

BRIEF DESCRIPTION OF THE DRAWINGS

FIG. 1a is a top plan view of the second and perforated card stock which, when folded and glued will form sleeve for an audio cassette tape including a flap which extends therefrom and which is intended to be selectively removed at the perforation.

FIG. 1b is a perspective view of the package formed from the card stock of FIG. 1a.

FIG. 2a is a top plan view of the present invention, similar to FIG. 1a but showing two tear-off portions or flaps.

FIG. 2b is a perspective view of the package formed from the card stock of FIG. 2a.

FIG. 3a is a view similar to that shown in FIG. 1, but showing the preferred embodiment of the invention wherein a single tear-off flap is provided and the side panel adjacent to the tear-off flap is wider than the opposed side panel.

FIG. 3b is a perspective view of the package formed from the card stock in FIG. 3a.

DETAILED DESCRIPTION OF THE PREFERRED EMBODIMENT

As best seen in FIGS. 1a and 1b, a flat card is die-cut from a piece of ordinary cardboard or cardboard stock. The flat card 10 consists of a rectangular portion 12 and a glue area or flap 14. The glue area or flap 14 is inwardly cut at its edges. It provides a gluing surface for almost the entire length of the sleeve, when formed. The rectangular area 12 consists of a front panel 16, a back panel 18 and a side panel. In the embodiment of FIG. 1b a side panel 20 is in between the front panel 16 and the rear panel 18 while a second side panel 34 is between the flap 14 and the front panel 16.

In the embodiment of the invention shown in FIGS. 1a and 1b, there is provided a perforated line 22, so that the flap 24 extending laterally from the back panel 18 can be easily severed after the device, containing a cassette, has been purchased. The other fold lines 26, 28, 30 and 32 are merely scored to facilitate folding of the device to form a rectangular sleeve which, when assembled, serves to snugly hold and contain an audio cassette tape. The side panel 34 is located between score lines 30 and 32 and separates glue area or flap 14 from the front panel 16.

According to the embodiment shown in FIGS. 1a and 2a, the second side panel 34, whether it be located between the glue area or flap 14 and the front panel 16, or between the back panel 18 and the first flap 24 is of the same width as side panel 20. As can be seen from the drawings, the length of the side panels is substantially equal to the length of the front panel, and the removable flap.

In the embodiment of FIG. 2a and 2b, removable flap 24 is separated from the second side panel 34 by a line of perforation. The flap 24 comprises two cards, separated from one another by a line of perforation 36. The second card 38 is separated in the embodiment of FIG. 2a and 2b from the first card by a line of perforation 36.

With the paper stock or flat card 10 scored and perforated as in FIG. 1a, for example, the back panel 18 is held in position and the side panel 20 is bent along score line 26 such that the side panel 20 is perpendicular to the back 18. Then, the front panel is folded, about score line 28 such that it is in spaced parallel confronting with back panel 18. The second side panel 34 is then bent perpendicular to the front panel about score lines 30, and the glue area or flap 14 is folded about score line 32, such that the glue flap is tucked in and score line 32 rests upon edge 22 of the back panel. Glue is first placed on glue area or flap 14 such that it adheres to the side of the back panel 18 proximate to the perforated edge 22. Then, the flap 24 of at least one card is bent about perforated line 22, such that the flap is located on top of and overlies the back panel 18. The audio cassette tape is then slid into the sleeve formed by the side panels and the front and back panels and, with the audio cassette tape so located, a cellophane wrap-around covering is applied to the packaged device.

The dimensioning of the front and back panels is such that the sleeve formed by the flat card 10, when constructed in accordance with the above description, substantially envelops and protects the audio cassette tape.

The width of the first side panel 20 and second side panel 34, in the embodiment of the invention shown in FIGS. 1a and 2a, is substantially equal to the width of the audio cassette tape at its playing head portion which, in a manner well known to those of ordinary skill in the art is slightly thicker than that portion of the audio cassette tape into which the spindles project during playing and recording. In this manner, the audio cassette tape is capable of being slid into and frictionally held in the sleeve formed from the flat card and, yet, when the cellophane wrap is removed, the audio cassette tape can be easily slid into and out of the sleeve. Then, as desired, the consumer can fold and tear the flap 24 away from the sleeve along line of perforation on edge 22, which extends between the flap and the back panel. In this manner, the flap 24, having printed information relating to the audio material recorded on the audio cassette tape, can be severed and viewed. Again, in the preferred embodiment of the present invention, the recording on the audio cassette tape can relate to any historic event and flap 24 can, therefore, have certain printed information of interest concerning such historical event.

In the embodiment of the invention shown in FIG. 2a, the second side panel is not located between the glue area on flap 14 and the front panel 18 but, rather, it is located between the back panel 18 and the first flap 24.

Also, in the embodiment of the invention shown in FIGS. 2a and 2b, therefore, a sleeve is still formed with the front and back panels in aligned relation and the side panels 20 and 34 perpendicular to the front and back panels, with the glue area 14, this time, held against side panel 34. Then, the first flap 24 and its second card portion 38 are folded by use of the second line of perforation 36. Then both flaps one on top of the other are folded along first line of perforation 22, and the two flaps are overlaid upon the exterior of the front panel 16.

Again, then, an audio cassette tape is slid within the sleeve and the entire package is wrapped in cellophane covering. When the consumer purchases the same and removes the cellophane wrapping, the audio cassette tape can be slid out from within the sleeve and the first and second cards removed from the sleeve by tearing at the first and second lines of perforation 22 and 36, respectively. In this embodiment of the invention, the second card can bear printed information relating to another participant in the historical event which is the subject of the recorded material on the cassette.

In the embodiment of the invention shown in FIG. 3, a pair of tear-off flaps or cards 24 and 38 are, again, provided. In this embodiment, the side panel 20 is, again, similar to that shown in FIG. 1, located between front panel 16 and back panel 18 and separated therefrom by score lines 26 and 28. The glue area or flap 14 is secured to the front panel 16 and separated therefrom by score line 32. Laterally extending from rear panel 18 is the second side panel 34. It is foldable about score line or back panel 18 and separated therefrom by score line or edge 23, which, in this embodiment, is not perforated, but, rather, is merely scored to facilitate folding into location such that the glue area or flap 14 can be secured to the inside of second side panel 34.

In this embodiment of the invention, it will be noted that the width of the second side panel 34 is greater than the width of the first side panel 20. The width, however, of glue area or flap 14, is such that when the flat card 10 is folded such that an O-shaped sleeve is formed for the audio cassette tape, the edge 40 of the glue area or flap 14 will be held against the back panel 18, at edge 23 and the score line 32 of the glue area or flap 14, will be along score line 42. Thus, second side panel 34 extends a little bit above the surface of the front panel by a distance equal to the amount by which the second side panel 34 is greater in width than the first side panel 20. In the embodiment of the invention shown in FIG. 3, the extension is illustrated by "d". A first and second removable flap or tear-off portion 24 and 38, respectively, is attached by a line of perforation 25 to the second side panel 34. Tear-off portions or flaps 24 and 38 are intended to depict written information which relates to the recorded material on the audio cassette tape, adapted to be secured within the sleeve of the present invention. The distance "d" of the extension of the second side panel above the front panel is designed such that the tear-off portions or flaps 24 and 38 can be held against the front panel, in substantially flush planar relationship, without unnecessarily increasing the overall dimensions of the package. In addition, it will be appreciated that multiple tear-off cards or flaps can extend laterally from flap 24 of the embodiment shown in FIG. 3 and with each additional tear-off portion or flap, connected to its adjacent tear-off portion or card by a line of perforation, the dimension "d" can be increased by the thickness of the additional cards such that the cards can be folded one upon another, and yet, a substantially rectangular package unit is provided with an "O" shaped sleeve capable of frictionally receiving and holding an audio cassette tape.

While the invention has been described primarily in connection with audio cassettes, it will be understood that it is equally applicable to video cassettes, in which case the dimensions will be greater than is the case with audio cassettes.

Obviously, numerous variations of the above described structure can occur to those skilled in the art. The invention is not to be limited to that described. The claims which follow, as the same are interpreted by the Courts, is the true scope of this invention.

I claim as follows:

1. A packaging device for a cassette comprising a sleeve having opposed front and rear walls, opposed side walls and end openings for permitting the introduction and frictional receipt of said cassette within said sleeve and a flap extending from said sleeve, said flap being easily detachable from said sleeve to define a card, said card having printed material related to the material recorded on said cassette tape.

2. A packaging device as claimed in claim 1 wherein said flap is secured to said sleeve by a line of perforation.

3. A packaging device as claimed in claim 1, wherein said sleeve and flap are integrally formed from a sheet of card stock.

4. A packaging device as claimed in claim 1 wherein said flap comprises two or more separable cards, each card being separable from its adjacent card by a line of perforation.

5. A slip-off protective sleeve for an audio cassette tape constructed from a single sheet of card stock and forming a pair of opposed large face panels and a pair of opposed side panels and further comprising at least one tear-off flap portion hingedly secured to said sleeve by a line of perforation, said flap portion substantially overlying and resting flush against one of said face panels, said flap portion having printed material related to the material recorded on said cassette tape.

6. A protective sleeve as claimed in claim 5 wherein the dimensioning of said large face panels and said side panels forms a friction fit for an audio cassette tape.

7. A protective sleeve as claimed in claim 5 wherein said flap portion comprises two or more printed material-carrying flaps, temporarily connected together yet, selectively separable by lines of perforations.

8. A protective sleeve as claimed in claim 5 wherein one of said face or side panels is further provided with a glue flap.

9. A protective sleeve as claimed in claim 5 wherein one of said side panels is provided with a width extension equal to the thickness of said tear-off flap portion.

10. A protective sleeve as claimed in claim 5 wherein said tear-off flap portion bears printed information relating to the audio recorded portion of a cassette tape packaged within said sleeve.

11. A package for an audio cassette tape formed from a sheet of card stock comprising:
    (a) a pair of face panels of dimension substantially equal to the flat faces of an audio cassette tape;
    (b) a pair of side panels, the width of said panels being about equal to the width of the playing head portion of said audio cassette tape; and
    (c) an extension flap, originally secured yet selectively removable from said package at a line of perforation, said extension flap being about equal in dimension to said face panels when folded against and overlying the same.

12. A package as claimed in claim 11 wherein said extension flap comprises two or more cards separable from one another by lines of perforation.

13. A package as claimed in claim 11 wherein one of said side panels is provided with an extension equal in width to the thickness of said extension flap when folded and overlayed against one of said face panels.

14. A package as claimed in claim 11 wherein one of said face or side panels is provided with a glue flap for securing said panels into an O-shaped sleeve.

* * * * *